(12) United States Patent
Chelf

(10) Patent No.: US 10,859,215 B2
(45) Date of Patent: Dec. 8, 2020

(54) LOW VOLTAGE LED FILAMENT ARRAY LIGHTING

(71) Applicant: Robert Bentley Chelf, Kalispell, MT (US)

(72) Inventor: Robert Bentley Chelf, Kalispell, MT (US)

(73) Assignee: Robert Bentley Chelf, Kalispell, MT (US)

( * ) Notice: Subject to any disclaimer, the term of this patent is extended or adjusted under 35 U.S.C. 154(b) by 285 days.

(21) Appl. No.: 15/907,180

(22) Filed: Feb. 27, 2018

(65) Prior Publication Data

US 2018/0252371 A1    Sep. 6, 2018

Related U.S. Application Data

(60) Provisional application No. 62/464,345, filed on Feb. 27, 2017.

(51) Int. Cl.
*F21K 9/64* (2016.01)
*F21V 3/00* (2015.01)
(Continued)

(52) U.S. Cl.
CPC .............. *F21K 9/64* (2016.08); *F21K 9/232* (2016.08); *F21K 9/237* (2016.08); *F21S 8/081* (2013.01);
(Continued)

(58) Field of Classification Search
None
See application file for complete search history.

(56) References Cited

U.S. PATENT DOCUMENTS

| 5,746,500 A | 5/1998 | Chien |
| 6,319,425 B1 | 11/2001 | Tasaki et al. |

(Continued)

FOREIGN PATENT DOCUMENTS

| CN | 201074748 Y | 6/2008 |
| CN | 201228876 Y | 4/2009 |

(Continued)

OTHER PUBLICATIONS

International Preliminary Report on Patentability for International Application PCT/US2018/020029, Report dated Aug. 27, 2019, dated Sep. 6, 2019, 6 Pgs.

(Continued)

*Primary Examiner* — Jared Fureman
*Assistant Examiner* — Aqeel H Bukhari
(74) *Attorney, Agent, or Firm* — KPPB LLP

(57) ABSTRACT

Low voltage LED filament array lighting in accordance with embodiments of the invention are illustrated. One embodiment includes a LED array light including a cover component with first and second faces and containing a control circuitry and a battery electrically coupled to the control circuitry, a solar panel in contact with the first face of the cover component and electrically coupled to the control circuitry, and an LED filament light bulb in contact with the second face of the cover component and electrically coupled to the control circuitry, wherein the LED filament light bulb comprises an array of LEDs and a fluorescent material, wherein the control circuitry routes electricity generated by the solar panel to the battery for storage when the solar panel is generating electricity, and wherein the control circuitry routes electricity from the battery to the LED filament light bulb when the solar panel is not generating electricity.

20 Claims, 12 Drawing Sheets

(51) Int. Cl.
*F21S 9/03* (2006.01)
*F21K 9/232* (2016.01)
*F21V 23/00* (2015.01)
*F21S 8/08* (2006.01)
*F21K 9/237* (2016.01)
*H02J 7/35* (2006.01)
*H05B 33/08* (2020.01)
*F21V 21/08* (2006.01)
*H05B 45/46* (2020.01)
*H05B 47/11* (2020.01)
*F21Y 115/10* (2016.01)
*F21Y 105/10* (2016.01)
*F21W 131/10* (2006.01)
*F21Y 103/10* (2016.01)

(52) U.S. Cl.
CPC .............. F21S 9/037 (2013.01); F21V 3/00 (2013.01); F21V 21/0824 (2013.01); H02J 7/35 (2013.01); H05B 45/46 (2020.01); H05B 47/11 (2020.01); *F21V 23/003* (2013.01); *F21W 2131/10* (2013.01); *F21Y 2103/10* (2016.08); *F21Y 2105/10* (2016.08); *F21Y 2115/10* (2016.08); *Y02B 20/46* (2013.01); *Y02B 20/72* (2013.01)

(56) References Cited

U.S. PATENT DOCUMENTS

| | | | |
|---|---|---|---|
| 6,371,637 | B1 | 4/2002 | Atchinson et al. |
| 7,649,323 | B1 | 1/2010 | Kuhlmann et al. |
| 2006/0071589 | A1 | 4/2006 | Radkov |
| 2006/0146534 | A1 | 7/2006 | Morton et al. |
| 2009/0059572 | A1* | 3/2009 | Wang ............ F21S 9/037 362/183 |
| 2010/0231120 | A1* | 9/2010 | Mitani ............ C04B 35/62665 313/503 |
| 2010/0327764 | A1 | 12/2010 | Knapp |
| 2012/0069581 | A1* | 3/2012 | Chen ............ F21V 3/061 362/311.14 |
| 2012/0181932 | A1* | 7/2012 | De Hollan ............ F21V 29/67 315/113 |
| 2013/0049609 | A1* | 2/2013 | Browder ............ F21V 21/0824 315/159 |
| 2013/0058080 | A1 | 3/2013 | Ge et al. |

FOREIGN PATENT DOCUMENTS

| | | |
|---|---|---|
| CN | 201726561 U | 1/2011 |
| CN | 202587467 U | 12/2012 |
| CN | 103874267 A | 6/2014 |
| CN | 105841055 A | 8/2016 |
| CN | 108834424 A | 11/2018 |
| DE | 19919987 A1 | 11/2000 |
| EP | 2287519 A2 | 2/2011 |
| VN | 67416 | 12/2019 |
| WO | 2005031894 A2 | 4/2005 |
| WO | 2018157158 A1 | 8/2018 |

OTHER PUBLICATIONS

International Search Report and Written Opinion for International Application No. PCT/US2018/020029, Search completed Apr. 13, 2018, dated Apr. 27, 2018, 10 Pgs.
"Instructable: How to make a solar rechargeable automatic LED night light", 2016, 6 pgs.
"Make Solar Window Lights", BigClive, Printed from: http://www.bigclive.com/string.htm, Retrieved on Nov. 18, 2016, 11 pgs.
Mitchell, "Talking Electronics—30 LED Projects", printed Nov. 21, 2016 from http://takingelectronics.com/projects/30%20LED%20Projects/30%20LED%Projects.html, 66 pgs.
Swagatam, "How to Make Solar Powered Party String Lights", Bright Hub Inc., updated Dec. 27, 2013, 9 pgs.

* cited by examiner

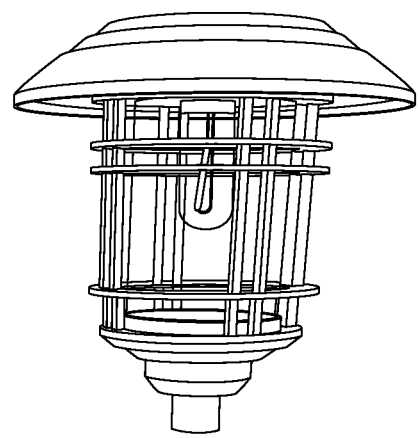
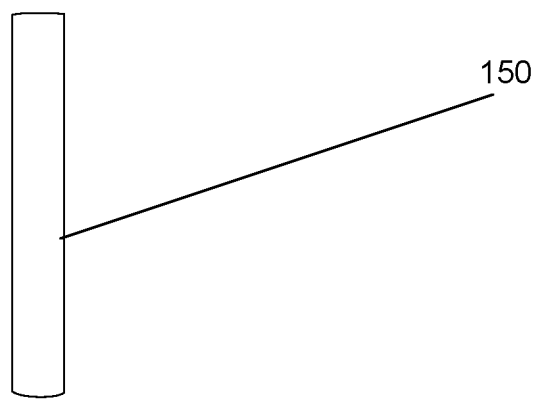
FIG. 1C

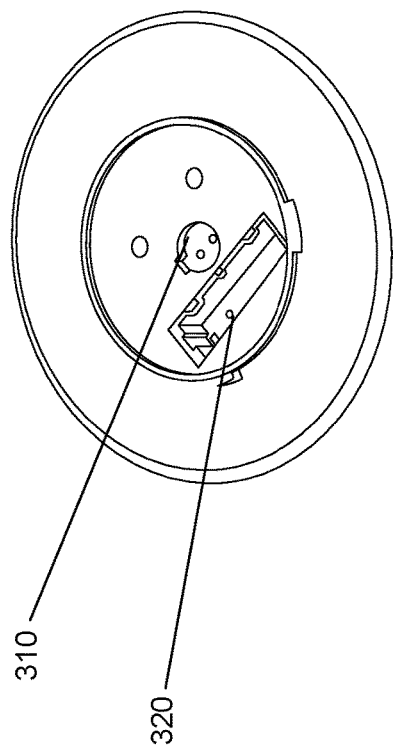
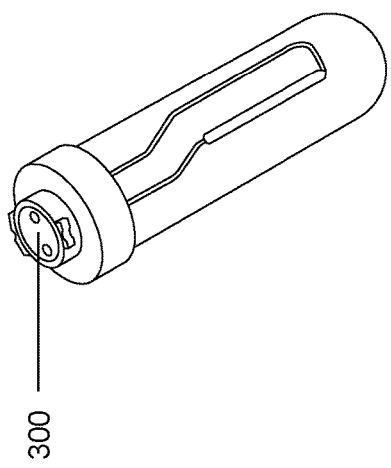
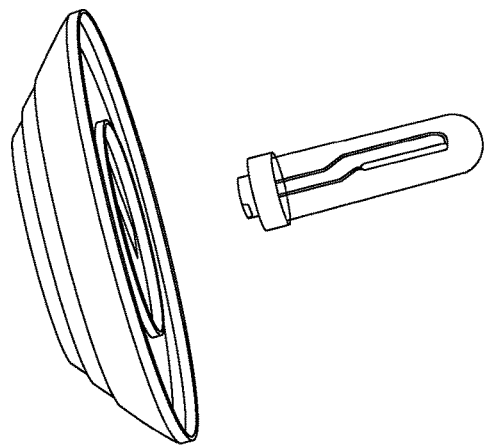
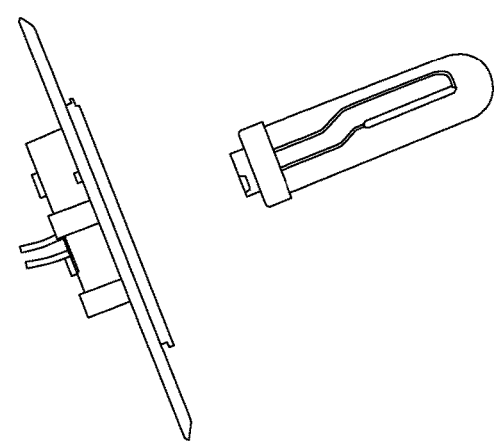
FIG. 3A
FIG. 3B
FIG. 3C
FIG. 3D

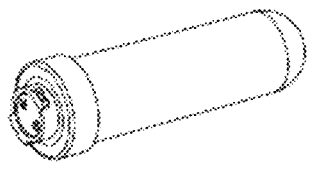
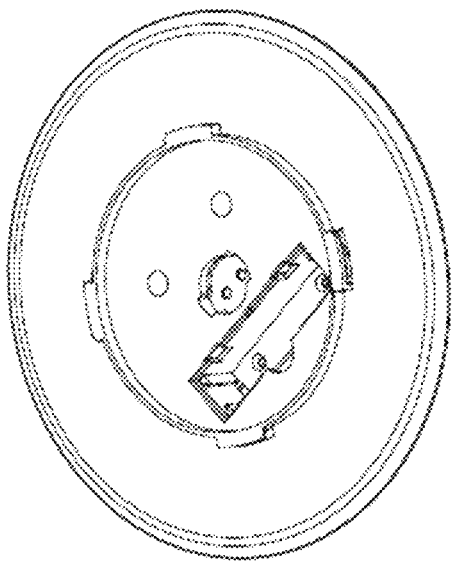
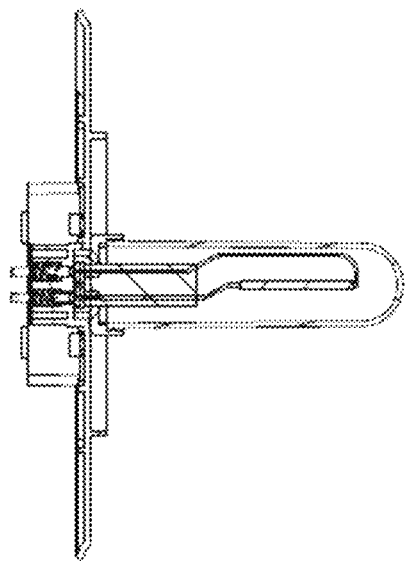
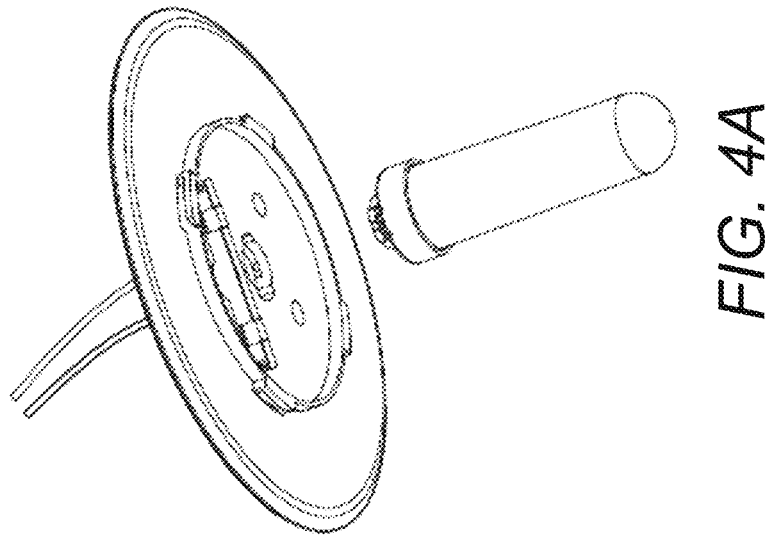

LOW VOLTAGE LED FILAMENT ARRAY LIGHTING

CROSS-REFERENCE TO RELATED APPLICATIONS

The current application claims priority under 35 U.S.C. 119(e) to U.S. Provisional Patent Application Ser. No. 62/464,345, entitled "Low Voltage Filament-Style LED Array Lighting", filed Feb. 27, 2017. The disclosure of U.S. Provisional Patent Application Ser. No. 62/464,345 is incorporated herein by reference in its entirety.

FIELD OF THE INVENTION

The present invention relates generally to low voltage LED filament lighting, and more specifically to low voltage LED filament lighting made to appear like an Edison-style filament bulb.

BACKGROUND OF THE INVENTION

Edison-style incandescent bulbs, often made with carbon or tungsten filaments, have remained popular, and are easily identified by their distinctive filament look, and warm color temperature. Improvements in lightning technology have yielded lighting elements that are more energy efficient than incandescent light bulbs. For example, Light Emitting Diodes (LEDs) are semiconductor light sources that can operate at low voltages with low overall energy requirements compared to incandescent bulbs.

Solar panels are made of photovoltaic cells (solar cells) which can convert light into electricity. A single solar cell typically operates around 0.5V. Multiple solar cells can be wired together in series to generate larger voltages, however an increase in solar cells necessitates an increase in size of the photovoltaic system.

SUMMARY OF THE INVENTION

Systems and methods low voltage LED filament array lighting in accordance with embodiments of the invention are illustrated. One embodiment includes a light-emitting diode (LED) array light including a cover component with a first face and a second face and containing a control circuitry and a battery electrically coupled to the control circuitry, a solar panel in contact with the first face of the cover component and electrically coupled to the control circuitry, and an LED filament light bulb in contact with the second face of the cover component and electrically coupled to the control circuitry, wherein the LED filament light bulb comprises an array of LEDs and a fluorescent material, wherein the control circuitry routes electricity generated by the solar panel to the battery for storage when the solar panel is generating electricity, and wherein the control circuitry routes electricity from the battery to the LED filament light bulb when the solar panel is not generating electricity.

In another embodiment, the LED filament light bulb is substantially perpendicular to the cover component.

In a further embodiment, the LEDs in the array of LEDs are linearly arranged and wired together in parallel.

In still another embodiment, the voltage of each LED in the array of LEDs is between 1.4V and 3.2V.

In a still further embodiment, the LEDs in the array of LEDs are arranged into sub-arrays of LEDs wired in series, and the sub-arrays of LEDs are wired together in parallel.

In yet another embodiment, each sub-array includes 4 LEDs operating at 3V per LED such that the circuit of sub-arrays wired in parallel is operating at 12V.

In a yet further embodiment, the array of LEDs are arranged in a linear pattern to emulate a filament.

In another additional embodiment, the control circuitry prevents electricity from flowing from the battery to the LED filament light bulb when the solar panel is exposed to light.

In a further additional embodiment, the fluorescent material emits light with a color temperature between 1700K and 3500K when stimulated by the array of LEDs In another embodiment again, the LED array light is water resistant.

In a further embodiment again, the cover component is coupled to a base component including a transparent casing and an attachment device.

In still yet another embodiment, the transparent casing is substantially cylindrical.

In a still yet further embodiment, the attachment device is a spike.

In still another additional embodiment, the attachment device further includes a flange.

In a still further additional embodiment, a LED array light includes an array of LEDs coated in a florescent material, where each LED in the array of LEDs is connected to a power source via parallel circuit, and the array of LEDs coated in the florescent material is linearly arranged, wherein the total voltage across the parallel circuit is between 1.4V and 3.2V.

In a still further additional embodiment, the power source is a solar panel.

In still another embodiment again, the power source comprises a solar panel and a power storage unit.

In a still further embodiment again, the LED array light further includes a control circuitry that routes power between the solar panel, the power storage unit, and the array of LEDs according to the power output of the solar panel.

In yet another additional embodiment, a LED array light includes a cover component with a first surface and a second surface, and containing a control circuitry and a battery, where the battery is electrically coupled to the control circuitry, a solar panel in attached to the first surface of the cover component and electrically coupled to the control circuitry, an LED filament element attached to the second surface of the cover component and electrically coupled to the control circuitry, wherein the filament element comprises a plurality of LEDs coated in a fluorescent material, and a housing attached to the cover component, wherein the housing allows at least some light to pass through it, and an attachment device attached to the housing, wherein the control circuitry routes electricity generated by the solar panel to the battery when the solar panel is generating electricity, and wherein the control circuitry routes electricity from the battery to LED filament light bulb when the solar panel is not generating electricity.

In a yet further additional embodiment, the plurality of LEDs are wired in parallel such that the voltage across the circuit is between 1.4V and 3.2V.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

FIG. 1C is a photograph of low voltage LED filament array light separated into several components in accordance with an embodiment of the invention.

FIG. 3A is a schematic illustration of a low voltage LED filament array light bulb in accordance with an embodiment of the invention.

FIG. 3B is a schematic illustration of a socket component in accordance with an embodiment of the invention.

FIG. 3C is a schematic illustration of a low voltage LED filament array light bulb aligned for socketing with a socket component in accordance with an embodiment of the invention.

FIG. 3D is a schematic illustration of a low voltage LED filament array light bulb aligned for socketing with a cover component in accordance with an embodiment of the invention.

FIG. 4A is a schematic illustration of a low voltage LED filament array light bulb aligned for socketing with a socket component in accordance with an embodiment of the invention.

FIG. 4B is a schematic illustration of a socket component in accordance with an embodiment of the invention.

FIG. 4C is a schematic illustration of a low voltage LED filament array light bulb in accordance with an embodiment of the invention.

FIG. 4D is a schematic illustration of a low voltage LED filament array light bulb aligned for socketing with a socket component in accordance with an embodiment of the invention.

DETAILED DISCLOSURE OF THE INVENTION

Figure 1A:
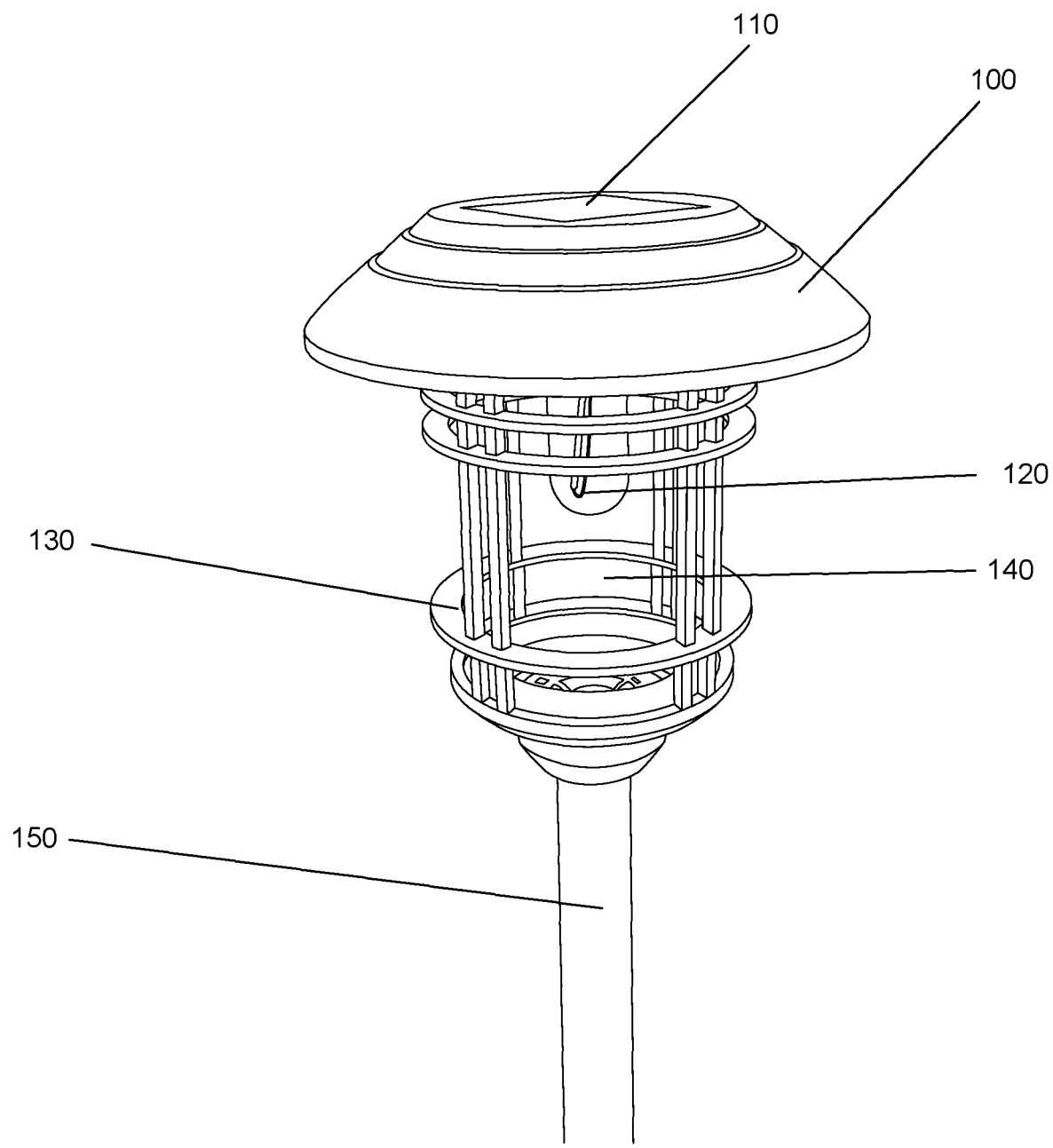
FIG. 1A is a photograph of a low voltage LED filament array light in accordance with an embodiment of the invention.

Turning now to the drawings, low voltage LED filament array light bulbs, and apparatuses for using low voltage LED filament light bulbs are illustrated. Edison-style filament bulbs remain a popular look, despite having been invented well over a century ago. However, incandescent filaments require a significant amount of energy to operate. Conventional LED filament arrays are made of numerous LEDs linearly arranged and wired in series, and generally covered in a coating of yellow phosphor in silicone resin binder material. Low voltage LED filament arrays can be made in such a way as to mimic Edison-style filaments. These filaments can be used to recreate the Edison-style look, while keeping voltage requirements low. The low voltage requirements of the herein described LED filament light bulb allow for numerous outdoor applications.

Voltage requirements can be changed by wiring the LEDs in different configurations. In many embodiments, wiring the LEDs in parallel minimizes the voltage requirement. In a variety of embodiments, groups of LEDs are wired in series, and then the groups of LEDs are wired in parallel to increase the voltage requirement. However, one of ordinary skill in the art would easily recognize that any LED wiring configuration could be used as appropriate to the requirements of given applications.

Low voltage requirements enable the LED filament array light bulb to operate using a low voltage battery, such as, but not limited to, AA sized batteries ranging from 1.2V to 3.7V. In a variety of embodiments, the battery used is a rechargeable battery. Batteries can be, but are not limited to, Nickel-Cadmium batteries, Nickel-metal hydride batteries, Lithium ion batteries, or any other construction of battery as appropriate to the requirements of given applications. However, in numerous embodiments, other energy storage units can be used such as, but not limited to, capacitors or any other energy storage device as appropriate to the requirements of specific applications of embodiments of the invention. Further, the low voltage requirement allows the bulb to be powered via a small solar panel consisting of at least one solar cell. In many embodiments, the solar panel powers the light bulb. In numerous embodiments, the solar panel recharges a battery, which battery powers the light bulb. In many embodiments, the LED filament array light bulb hangs downward from a cover component.

In certain embodiments, a transformer can be used to step down a main line voltage, for example 120V in the United States, to anywhere between 1.2V and 12V. In some embodiments, the transformer steps the voltage down to higher than 12V, or lower than 1.2V. In some embodiments, a stepped down line drives the LED filament array light bulb. In several embodiments, when a stepped down line is used, the LED filament array light bulb is attached to the base component and pointed upwards.

LED filament array light bulbs can be fixed into a socket. In many embodiments, the socket is attached to a housing. In certain embodiments, the housing also has a solar panel, at least one compartment to house at least one battery, and/or circuitry providing power to the LED filament array light bulb. In numerous embodiments, the solar panel is on an opposite face of the housing relative to the socket. In a variety of embodiments, the housing is part of a larger structure which can be placed outside to function as an outdoor light. A discussion of the housing can be found below.

Low Voltage LED Filament Array Lighting

Many outdoor lighting solutions use relatively high voltage to drive incandescent, compact fluorescent lamp (CFL) bulbs, and/or any other relatively high voltage requiring bulbs. However, low voltage LED filament array light bulbs can be operated using relatively small batteries. In many embodiments, the batteries are recharged using a small solar panel. This allows for applications of low voltage LED filament array light bulbs in outdoor spaces that do not require connections to electric lines, such as, but not limited to, the consumer 120V electric grid. Consequently, low voltage LED filament array light bulbs can be fixed in housings designed for outdoor use.

Figure 1B:
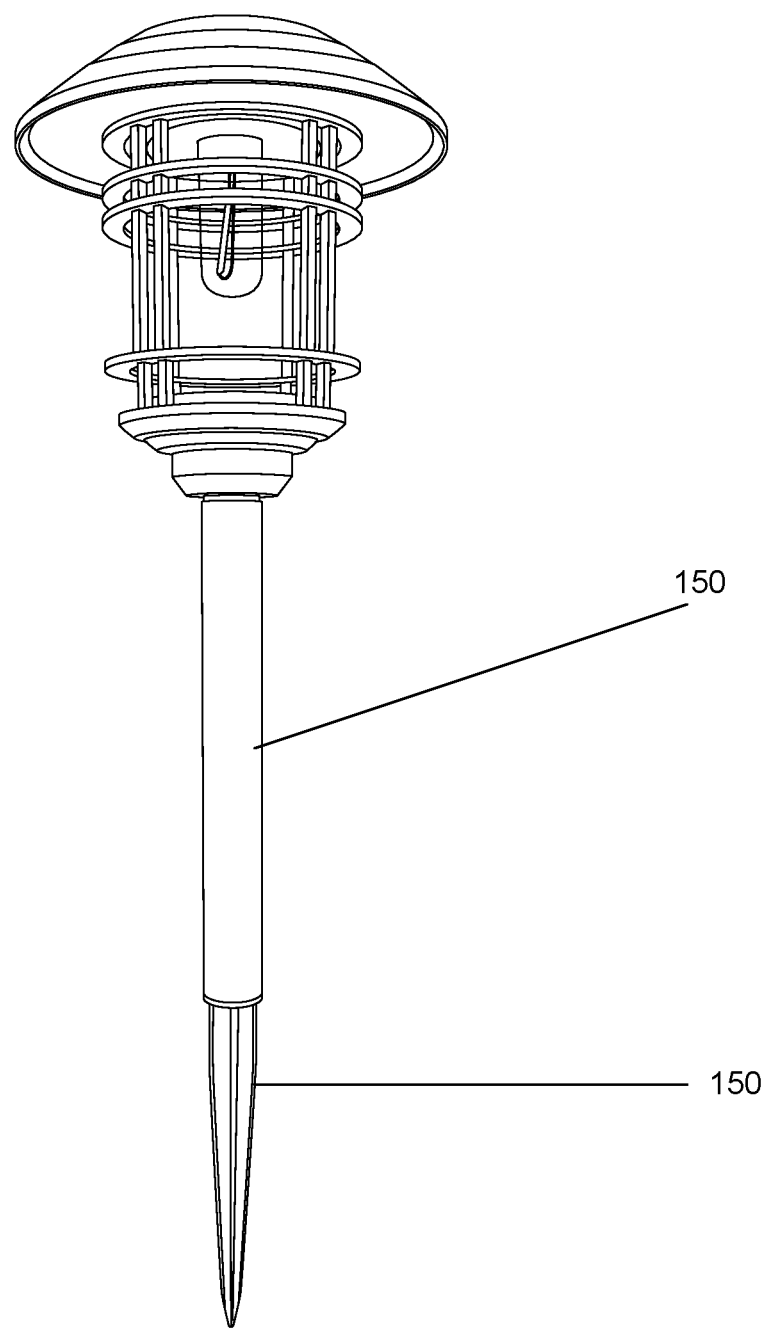
FIG. 1B is a photograph of a low voltage LED filament array light in accordance with an embodiment of the invention.

Turning now to FIG. 1A, a low voltage LED filament light bulb in a housing is shown in accordance with an embodiment of the invention. Cover component 100 has an upward facing solar panel 110 and a downward facing socket into which a low voltage LED filament array light bulb 120 can be fit. The cover component 100 is fit on to base component 130. In many embodiments, a transparent casing 140 is arranged between base component 130 and cover component 100. Transparent casing 140 can be made of glass, plastic, or any other material as appropriate to the requirements of given applications. In many embodiments, transparent casing 140 is in the shape of a cylinder. However, any shape can be used, such as, but not limited to, a prism, a polyhedron, or any curved shapes appropriate to the requirements of a given application. An attachment device 150 is connected to the base component. In many embodiments, the attachment device is a pole or rod. In several embodiments, the attachment device is a bracket, or any other attachment mechanism as appropriate to the requirements of a given application. In many embodiments, the base component is shaped at the bottom into a form that will stabilize the unit in the ground. For example, the base component can be shaped into a spike. The attachment device can have a flange in order to stabilize the unit against the ground. In a variety of embodiments, the base component is shaped in such a way as to facilitate attachment of the unit to a wall, and/or the ground. In some embodiments, the attachment device is two or more pieces that are fit together. In FIG. 1B, a low voltage LED filament array light is illustrated with its attachment device assembled in accordance with an embodiment of the invention is illustrated. In FIG. 1C, a low voltage LED filament array light is illustrated with its attachment device disassembled in accordance with an embodiment of the invention is illustrated.

As one of ordinary skill in the art can appreciate, FIG. 1 merely illustrates a single embodiment of the invention. Cover components and base components can be manufactured to have different cosmetic forms. In numerous embodiments, the transparent cylinder is tinted to produce additional lighting effects. In a variety of embodiments, the transparent cylinder is not present. The solar panel and/or cover component can be tilted to better face the sun's light. While a particular embodiment of a low voltage LED filament light bulb in a housing is discussed above, one of ordinary skill in the art will appreciate that the components could be rearranged, replaced, or modified as appropriate to the requirements of given embodiments. A discussion of cover components can be found below.

Cover Components for LED Filament Array Light Bulbs

In accordance with many embodiments of the invention, cover components are separated into a lid component and a socket component. In some embodiments, lid components and socket components are fused together to make a cover component. In certain embodiments, the socket component contains a socket into which low voltage LED filament array bulbs can be inserted. Cover components for LED filament array lighting can be made in a variety of different forms as appropriate to the requirements of given applications. Cover components can also have compartments for batteries. In numerous embodiments, the cover component contains circuitry that can be used to control the flow of electricity between at least two of a battery, a solar panel, and a low voltage LED filament array bulb. The socket for low voltage LED filament array bulbs can be directly connected to the circuitry.

Figure 2:
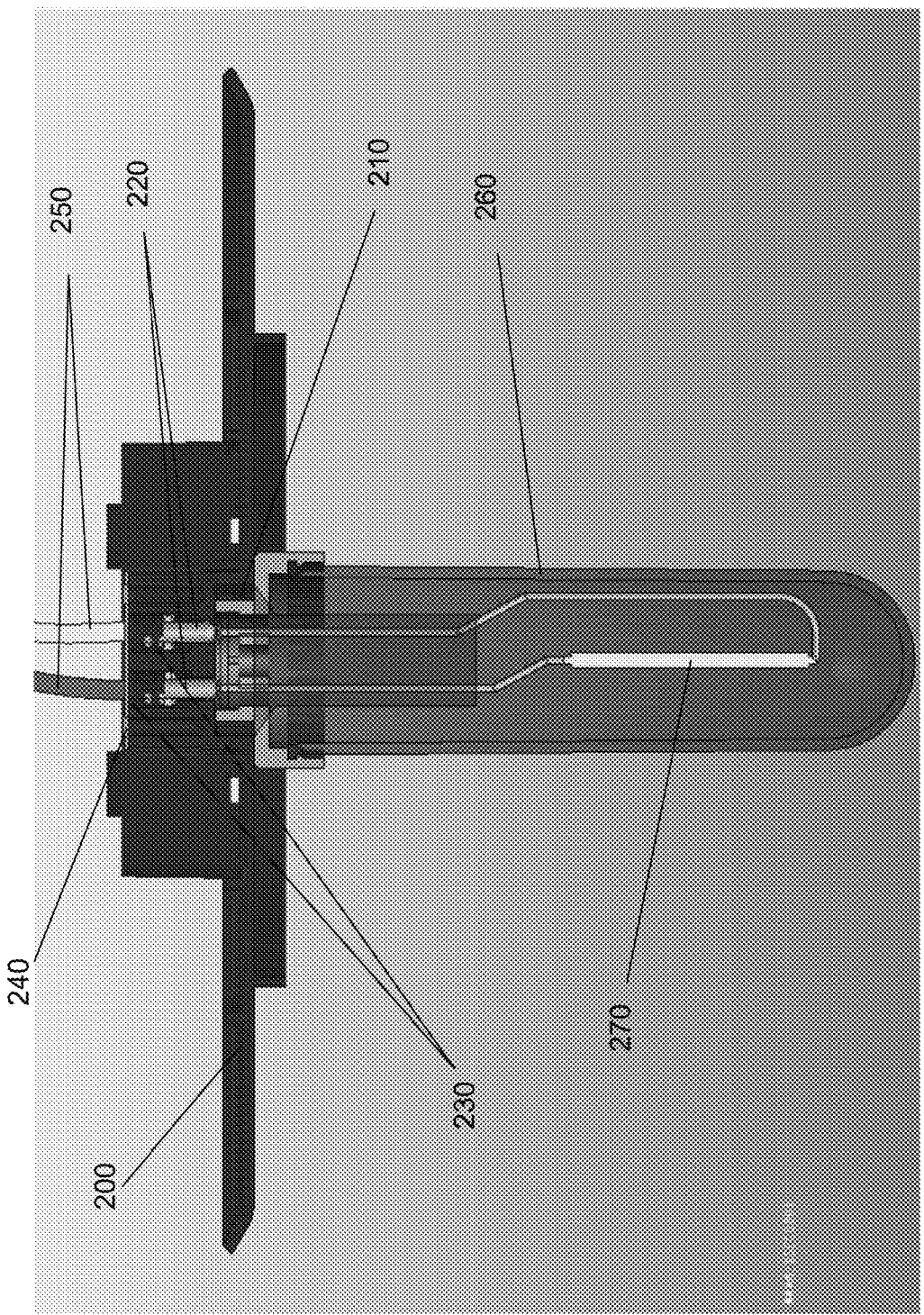
FIG. 2 is a schematic illustration of a low voltage LED filament array light bulb socketed in a socket component in accordance with an embodiment of the invention.

Turning now to FIG. 2, a socket component with a socket for a low voltage LED filament array bulb is illustrated in accordance with an embodiment of the invention. In many embodiments, base component 200 houses a socket 210. Socket 210 has positive and negative connectors 220 that carry current. In many embodiments, connectors 220 can be concave structures that receive a set of plugs from a bulb. In a variety of embodiments, connectors 220 are flat, electrically conductive surfaces that align with a second set of connectors from a bulb. However, connectors 220 can be convex, concave, flat, or any other shape that can be used to channel current to a bulb as appropriate to the requirements of a given embodiment. In the illustrated embodiment, connectors 220 fit into channels containing springs 230. In many embodiments, a bulb is inserted into the socket, and the connectors 220 are depressed through the channel and make contact with a printed circuit board (PCB) 240. PCB 240 can pass current from positive and negative wires 250 through the connectors 220 to a connected light bulb 260. In a variety of embodiments, connectors 220 are not depressed, and contact with the bulb is sufficient to pass current. In many embodiments, the wires 250 are connected to a battery. In numerous embodiments, PCB 240 further connects to a solar panel, and can regulate power flow between connected elements, such as, but not limited to, the bulb 260, a solar panel, a battery, or any other connected electrical device as appropriate to the requirements of a given application.

In one embodiment, bulb 260 includes a shell. In numerous embodiments, the shell is made of plastic. However, the shell can be made of glass, acrylic, or any other material as appropriate to the requirements of a given application. In many embodiments, the shell can be tinted. Bulb 260 can contain at least one LED filament array. LED filament arrays and their uses are discussed further below. As one of ordinary skill in the art can readily appreciate, in various embodiments, the socket components can be made in a variety of configurations, and use a variety of different wiring components in accordance with the requirements of a given application. Assembly of cover components and socketing of bulbs is discussed below.

Socketing LED Filament Array Light Bulbs

In numerous embodiments, LED filament array light bulbs are socketed into cover components. In many embodiments, LED filament array light bulbs have socketable plugs. Socketable plugs and sockets can have complimentary shapes in order to facilitate the connection between LED filament array light bulbs and cover components. A variety of socketable plugs and/or socket shapes can be used in accordance with the requirements of given applications.

Turning now to FIG. 3A, a plug shape in accordance with an embodiment of the invention is illustrated. LED filament array light bulb has a socketable plug 300. Socketable plug 300 can have leads that enable the passage of electricity in order to power the bulb. In many embodiments, socketable plug 300 has a number of cavities and/or protuberances that allow the bulb to be secured in place against the socket.

Turning now to FIG. 3B, a socket component of a cover component in accordance with an embodiment of the invention is illustrated. The socket component can have a socket 310 for a bulb. Socket 310 can have a complimentary number of cavities and/or protuberances with respect to a bulb in order to facilitate the socketing. In a number of embodiments, socket components have compartments 320 to house batteries.

Turning now to FIG. 3C, the socketing of an LED filament array light bulb into the socket of a socket component in accordance with an embodiment of the invention is illustrated.

Turning now to FIG. 3D, the socketing of an LED filament array light bulb into the socket of a socket component of a completed cover component in accordance with an embodiment of the invention is illustrated. While socket components, bulbs, and cover components are described above with respect to particular embodiments of the invention, one of ordinary skill in the art would readily appreciate that any number of configurations could be used as appropriate to the requirements of given applications. A discussion of the low voltage LED filament arrays used in the LED filament array light bulbs follows below.

Low Voltage LED Filaments

LED filament array lighting can operate at low voltages. In numerous embodiments, the circuitry of the LED filament array can be altered to meet or create specific voltage requirements for operation. One or more LED filament arrays can be wired together in a single bulb.

Figure 5A:
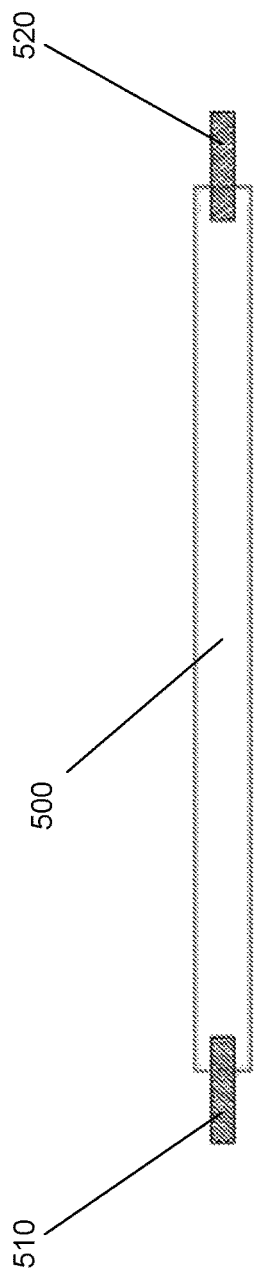
FIG. 5A is a schematic illustration of a base support of a low voltage LED filament array in accordance with an embodiment of the invention.

Turning now to FIG. 5A, a base support for a LED filament array in accordance with an embodiment of the invention is illustrated. Base support 500 can be made of plastic, metal, glass, ceramic, porcelain, sapphire materials, or any other material as appropriate to the requirements of a given embodiment. In the illustrated embodiment, the base support has a positive lead 510 and a negative lead 520. In many embodiments, the leads are on opposite sides of the base support. In numerous embodiments, the leads are on the same side of the base support. However, any lead configuration can be used as appropriate to the requirements of a given application.

Figure 5B:
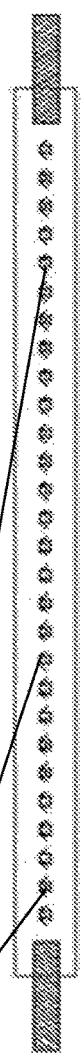
FIG. 5B is a schematic illustration of a base support of a low voltage LED filament array fitted with LEDs in accordance with an embodiment of the invention.

Turning now to FIG. 5B, a base support fitted with LEDs in accordance with an embodiment of the invention is illustrated. LEDs 530 are attached to the base support using soldering techniques, glue, or any other adhesive technique as appropriate to the requirements of given applications. In many embodiments, the LEDs emit white light. However, any color LED can be used as appropriate to the requirements of a given application. In some embodiments, the LEDs are uncoated. In many embodiments, the LEDs do not have lenses. In a variety of embodiments, the LEDs have lenses. The LEDs can be wired together as an array in such a way that they can be powered by the positive and negative leads attached to the base support. In many embodiments, between 10 and 40 LEDs are on a single filament. However, any number of LEDs can be used as appropriate to the requirements of given applications.

Figure 5C:
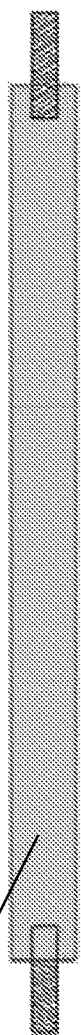
FIG. 5C is a schematic illustration of a complete low voltage LED filament array in accordance with an embodiment of the invention.

Turning now to FIG. 5C, a LED filament array coated with fluorescent material in accordance with an embodiment of the invention is illustrated. Fluorescent material 540 fluoresces in response to optical stimulation from the LEDs. In many embodiments, a fluorescent material is a fluorescent adhesive. In some embodiments, the florescent material is a tube with phosphate. However, any fluorescent material can be used as appropriate to the requirements of given applications. Fluorescent material 540 can be modified to emit a given set of wavelengths of light at given intensities when stimulated. In many embodiments, fluorescent material 540 gives off a wavelength in the warm color spectrum. In numerous embodiments, the color temperature of the fluorescent material is between 1700K and 3500K. However, any fluorescent material with a color temperature with a broader range can be used as appropriate to the requirements of given applications. In some embodiments, the color temperature can be as high as 6500 k. In many embodiments, fluorescent material 540 is applied in such a way that the LED filament array appears to be cylindrical.

Figure 5D:
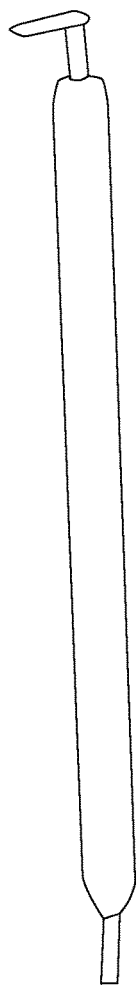
FIG. 5D is an image of a complete low voltage LED filament array in accordance with an embodiment of the invention.

Turning now to FIG. 5D, a completed LED filament array in accordance with an embodiment of the invention is illustrated. Circuitry for LED filament arrays are discussed below.

LED Filament Array Circuitry

LED filament array circuitry can be modified to use different voltage levels. In many embodiments, voltage levels are determined based on the wiring configuration of the LEDs. In general, wiring LEDs in parallel causes the voltage across each LED to be the same, and the total current is the sum of the currents through each LED. When wired in series, the current through each LED is the same, but the voltage across the circuit is the sum of the voltages of each LED. Wiring LEDs in series can have the advantage of maintaining the same current across each LED, meaning the brightness of each LED will be kept stable, and there can be less of a chance of thermal runaway. However, by coating LEDs in fluorescent material, any variation in LED luminosity can be mitigated.

Figure 6:
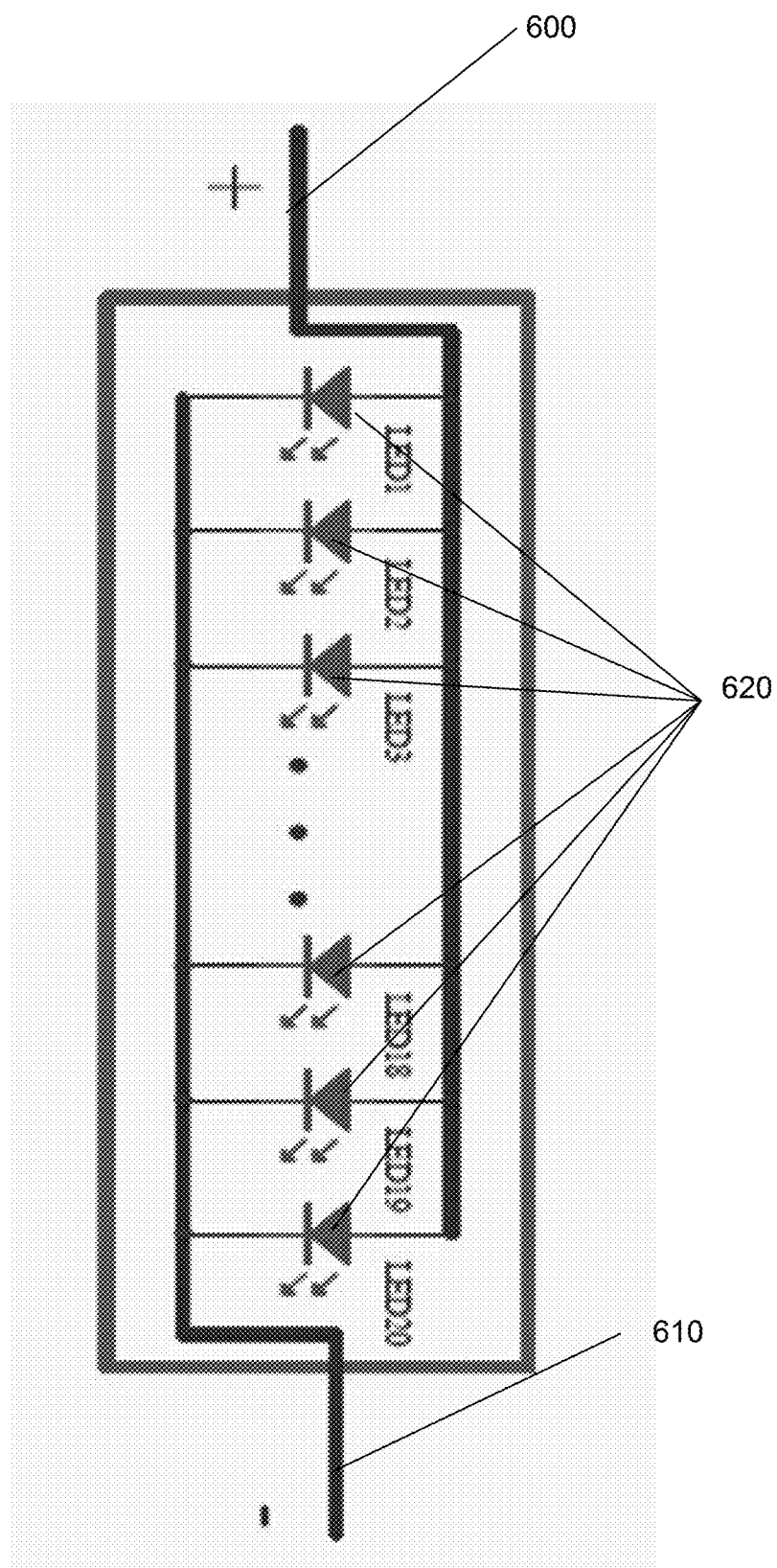
FIG. 6 is a circuit diagram of a low voltage LED filament array wired in parallel in accordance with an embodiment of the invention.

Turning now to FIG. 6, a circuit diagram for a parallel circuit for a LED filament array in accordance with an embodiment of the invention is illustrated. The LED filament array can have a positive lead 600, and a negative lead 610. In the illustrated embodiment, LEDs 620 are wired in parallel between the leads. LEDs can be evenly spaced, unevenly spaced, or placed in a pattern between the leads as appropriate to the requirements of given applications. In some embodiments, there are 20 LEDs per LED filament array. However, any number of LEDs can be used as appropriate to the requirements of given applications. By wiring the LEDs in parallel, the voltage across the LED filament array is the same as the voltage of each unit. In many embodiments, the voltage of each LED is between 1.4V and 3.2V. In some embodiments, the voltage can be higher than 3.2V, for example 12 V or 15 V. However, any voltage can be used as appropriate to the requirements of given applications.

Figure 7:
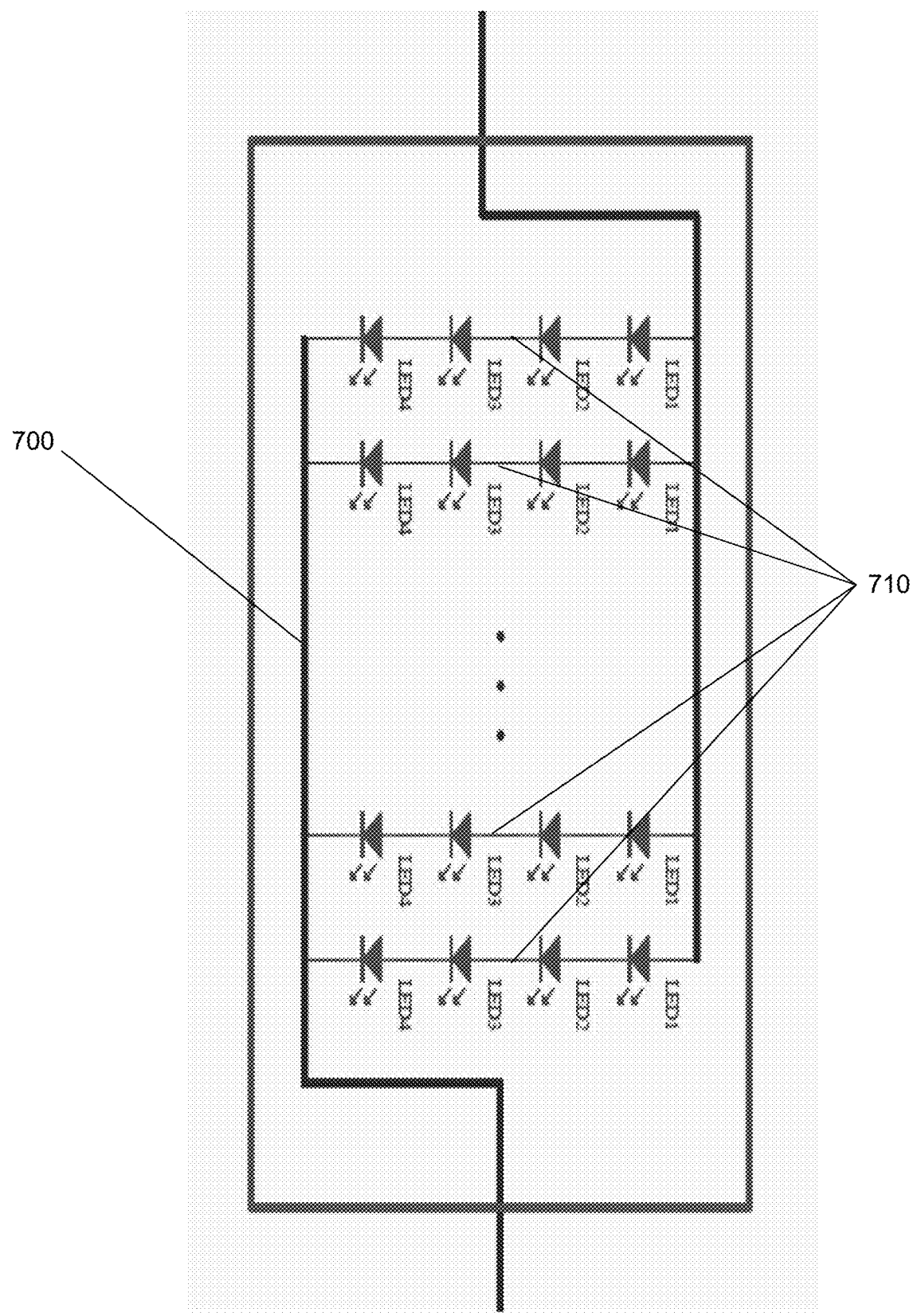
FIG. 7 is a circuit diagram of a low voltage LED filament array wired in series and parallel in accordance with an embodiment of the invention.

Turning now to FIG. 7, a circuit diagram for a hybrid parallel/series circuit for a LED filament array in accordance with an embodiment of the invention is illustrated. Circuit 700 includes at least two sub-arrays of LEDs wired in series 710. Within circuit 700, each sub-array is wired in parallel to the other sub-arrays. In many embodiments, sub-arrays of at least two LEDs are wired in series, and at least two sub-arrays are wired in parallel. In this way, the voltage across the entire LED filament array is the same as the voltage of each sub-array. The number of LEDs in each sub-array can be changed in order to achieve a specific voltage. In many embodiments, there are 4 LEDs per series operating at 3V each, for a total of 12V across the circuit. However, any number of LEDs can be used as appropriate to the requirements of a given application.

Figure 8:
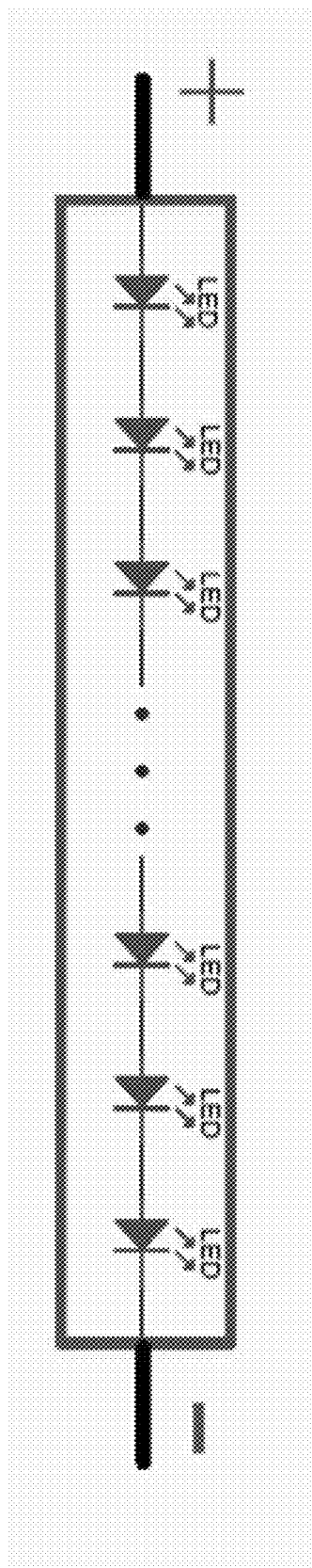
FIG. 8 is a circuit diagram of a low voltage LED filament array wired in series in accordance with an embodiment of the invention.

Turning now to FIG. 8, a circuit diagram for a series circuit for an LED filament in accordance with an embodiment of the invention is illustrated. LEDs can be wired in series to achieve an additive voltage across the circuit. While specific circuits and numbers of LEDs are illustrated in the figures described above, one of ordinary skill in the art can appreciate that any number of LEDs and wiring configurations can be used in accordance with the requirements of given applications. In order to power the LED filament array light bulbs, control circuitry can be used to regulate electricity usage.

Low Voltage LED Filament Array Lighting Control Circuits

Control circuits can be housed within the cover component of a low voltage LED lighting unit. In many embodiments, the control circuits control the flow of power between at least two of a solar panel, a LED filament array bulb, and a battery. In numerous embodiments, control circuits direct power from the solar panel to the battery when the solar panel is exposed to light in order to charge the battery. Control circuitry can prevent power from flowing from the battery to the LED filament array bulb when the solar panel is exposed to light. In this way, during the day, the battery can be charged and the light will be off, and during the night, the light can be operated using the battery. In many embodiments, when the solar panel is exposed to sufficient light, the voltage of the solar panel is larger than the voltage of the battery and the control circuitry directs electricity from the solar panel to the battery, and no electricity will flow through LED filament array bulb. In numerous embodiments, when the solar panel is not exposed to sufficient light, the voltage of the solar panel is lower than that of the battery, and the control circuit discharges electricity from the battery through the LED filament array bulb until the battery voltage is below its protective voltage. In a variety of embodiments, the solar panel directly powers the LED filament array bulb. Control circuit designs are described below.

Figure 9:
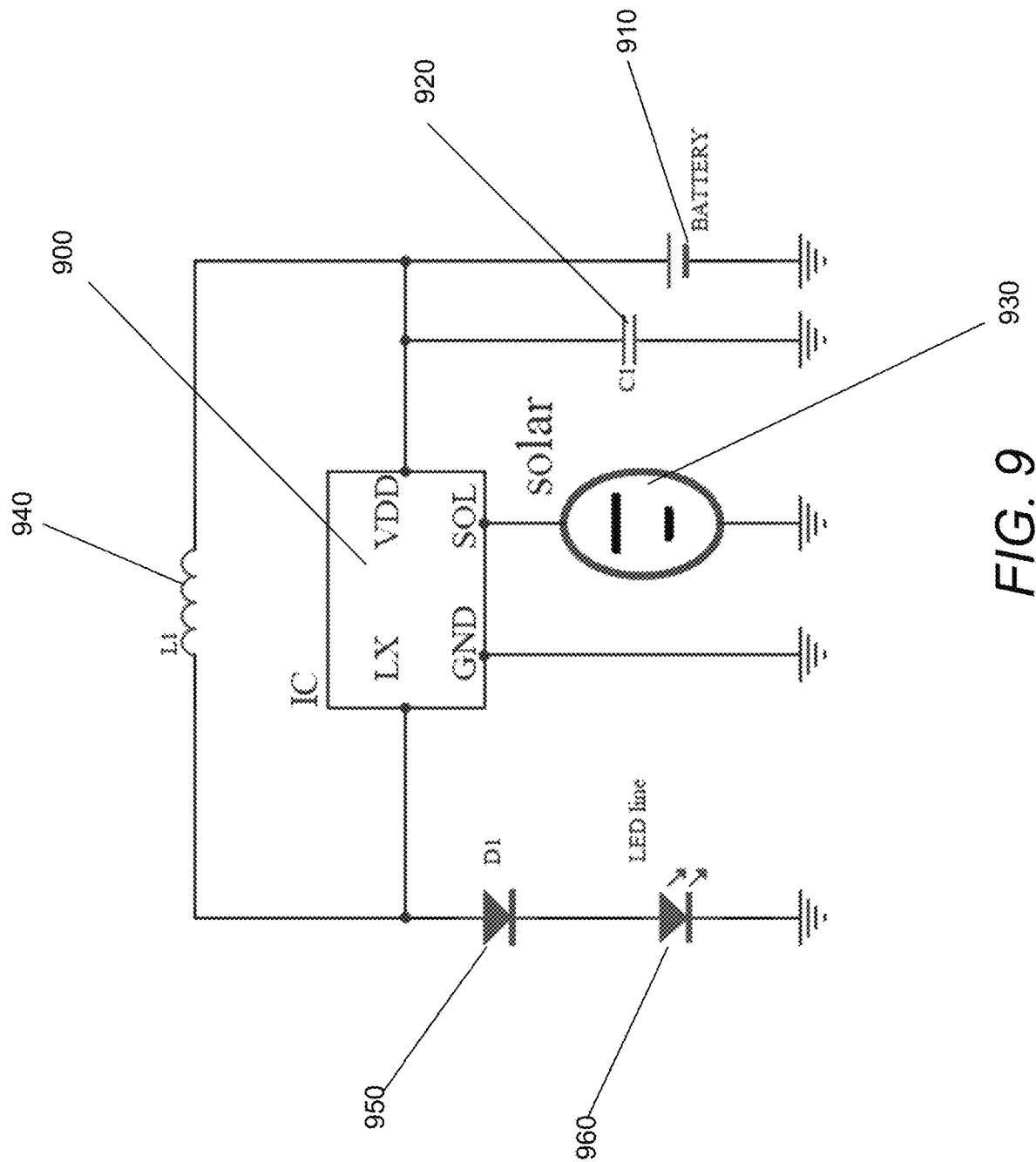
FIG. 9 is a circuit diagram for a control circuit for a low voltage LED filament array lighting unit in accordance with an embodiment of the invention.

Turning now to FIG. 9, a circuit diagram for a control circuit in accordance with an embodiment of the invention is illustrated. In the illustrated embodiment, an integrated circuit 900 is connected to a battery 910. Integrated circuit 900 is connected to a capacitor 920. Integrated circuit 900 is connected to a solar panel 930. Integrated circuit 900 is connected to at least one inductor 940. Integrated circuit 900 is connected to a diode 950 in order to correctly direct current to at least one LED filament array 960. In a variety of embodiments, integrated circuit 900 is a YX8019 manufactured by Shiningic of Shanghai, China. In numerous embodiments, integrated circuit is a YX8613 manufactured by Shiningic of Shanghai, China. In several embodiments, integrated circuit 900 is a YX8182 manufactured by Shiningic of Shanghai, China. In many embodiments, integrated circuit 900 is a 5252F manufactured by ROHM Semiconductor of Kyoto, Japan. One of ordinary skill in the art would appreciate that any number of integrated circuits can be used as appropriate to the requirements of a given application.

Figure 10:
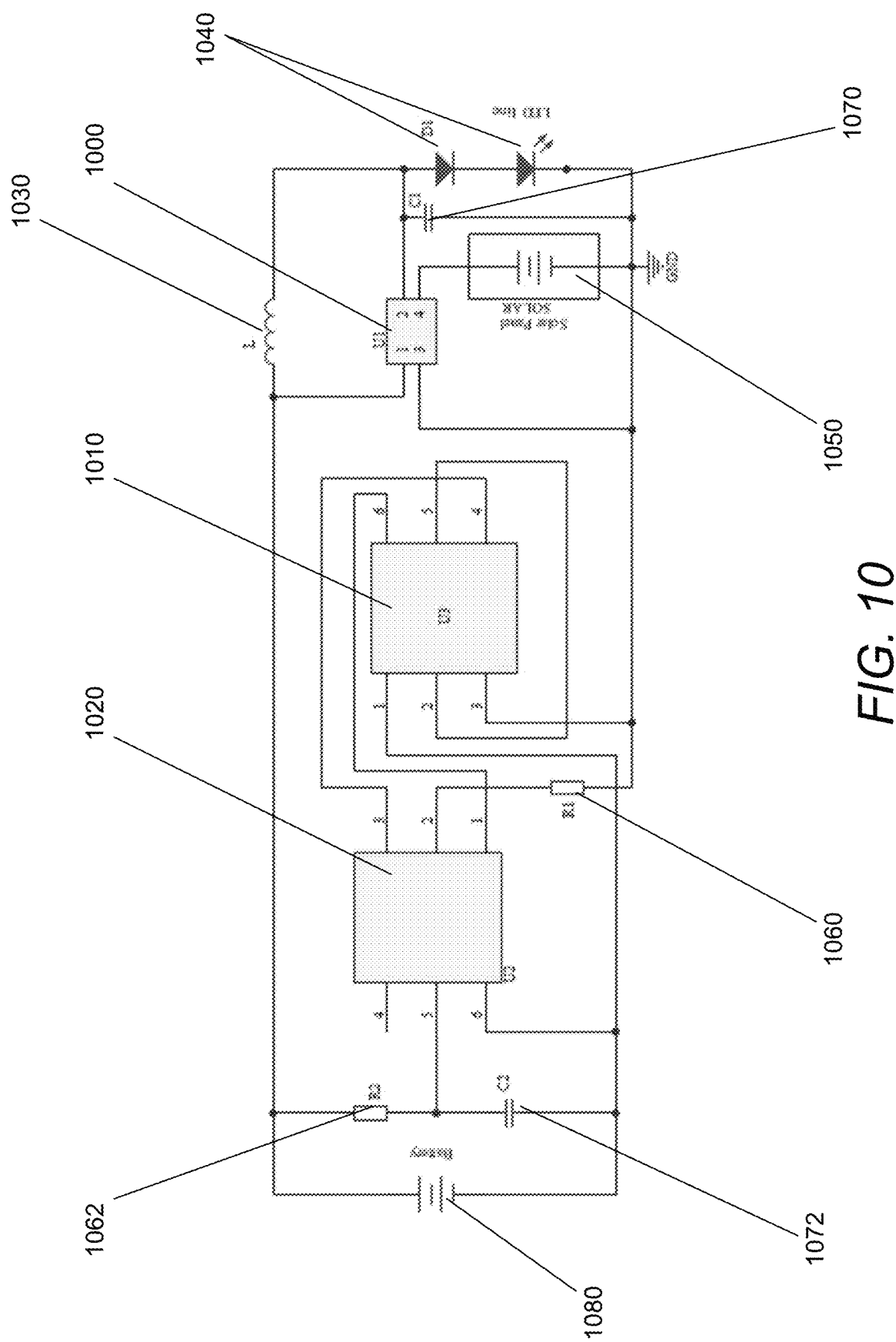
FIG. 10 is a circuit diagram for a control circuit for a low voltage LED filament array lighting unit in accordance with an embodiment of the invention.

Turning now to FIG. 10, a circuit diagram for a control circuit in accordance with an embodiment of the invention is illustrated. The control circuit has a first integrated circuit 1000, a second integrated circuit 1010, and/or a third integrated circuit 1020. An inductor 1040 is included in the control circuit. Control circuit has LEDs 1040 connected and wired in a configuration for an LED filament array bulb as described above. In many embodiments, solar panel 1050 is part of the circuit. The control circuit has a first resistor 1060 and/or a second resistor 1062. A first capacitor 1070 and/or a second capacitor 1072 is connected to the control circuit. A battery 1080 as described above is incorporated into the control circuit. While some components have been described as having only single or multiple instances, any number of components can be used as appropriate to the requirements of specific applications of a given embodiment. For example, a single resistor and/or capacitor could be used, or multiple resistors and/or capacitors can be used. By way of further example, multiple batteries or inductors can be used.

Although the present invention has been described in certain specific aspects, many additional modifications and variations would be apparent to those skilled in the art. While certain specific embodiments of circuit diagrams have been described, one of ordinary skill in the art would appreciate that individual components can be replaced, modified, and/or removed in accordance with given requirements of a given application. Some embodiments can be designed in ways that components are modular and separable. It is therefore to be understood that the present invention can be practiced otherwise than specifically described without departing from the scope and spirit of the present invention. Thus, embodiments of the present invention should be considered in all respects as illustrative and not restrictive.

What is claimed is:

1. A light-emitting diode (LED) array light comprising:
  a cover component with a first face and a second face and containing a control circuitry and a battery electrically coupled to the control circuitry;
  a solar panel in contact with the first face of the cover component and electrically coupled to the control circuitry; and
  an LED filament light bulb in contact with the second face of the cover component and electrically coupled to the control circuitry, wherein the LED filament light bulb comprises an array of LEDs and a fluorescent material, and extends substantially beyond the cover component in a direction away from the second face of the cover component;
  wherein the array of LEDs comprises a plurality of low-voltage LEDs arranged in a linear pattern to emulate a filament;
  wherein the control circuitry routes electricity generated by the solar panel to the battery for storage when the solar panel is generating electricity; and
  wherein the control circuitry routes electricity from the battery to the LED filament light bulb when the solar panel is not generating electricity.

2. The LED array light of claim 1, wherein the LED filament light bulb is substantially perpendicular to the cover component.

3. The LED array light of claim 1, wherein the LEDs in the array of LEDs are linearly arranged and wired together in parallel.

4. The LED array light of claim 3, wherein the voltage of each LED in the array of LEDs is between 1.4V and 3.2V.

5. The LED array light of claim 1, wherein the LEDs in the array of LEDs are arranged into sub-arrays of LEDs wired in series, and the sub-arrays of LEDs are wired together in parallel.

6. The LED array light of claim 5, wherein each sub-array comprises 4 LEDs operating at 3V per LED such that the circuit of sub-arrays wired in parallel is operating at 12V.

7. The LED array light of claim 1, wherein the plurality of low-voltage LEDs comprises at least 16 LEDs.

8. The LED array light of claim 1, wherein the control circuitry prevents electricity from flowing from the battery to the LED filament light bulb when the solar panel is exposed to light.

9. The LED array light of claim 1, wherein the fluorescent material emits light with a color temperature between 1700K and 3500K when stimulated by the array of LEDs.

10. The LED array light of claim 1, wherein the LED array light is water resistant.

11. The LED array light of claim 1, wherein the cover component is coupled to a base component comprising a transparent casing and an attachment device.

12. The LED array light of claim 11, wherein the transparent casing is substantially cylindrical.

13. The LED array light of claim 11, wherein the attachment device is a spike.

14. The LED array light of claim 13, wherein the attachment device further comprises a flange.

15. A light-emitting diode (LED) array light comprising:
an array of LEDs coated in a fluorescent material, where each LED in the array of LEDs is connected to a power source via parallel circuit;
wherein the array of LEDs comprises a plurality of low-voltage LEDs arranged in a linear pattern to emulate a filament; and
wherein the total voltage across the parallel circuit is between 1.4V and 3.2V.

16. The LED array light of claim 15, wherein the power source is a solar panel.

17. The LED array light of claim 15, wherein the power source comprises a solar panel and a power storage unit.

18. The LED array light of claim 17, further comprising a control circuitry that routes power between the solar panel, the power storage unit, and the array of LEDs according to the power output of the solar panel.

19. A light-emitting diode (LED) array light comprising:
a cover component with a first surface and a second surface, and containing a control circuitry and a battery, where the battery is electrically coupled to the control circuitry;
a solar panel in attached to the first surface of the cover component and electrically coupled to the control circuitry;
an LED filament element attached to the second surface of the cover component and electrically coupled to the control circuitry, wherein the filament element comprises a plurality of LEDs coated in a fluorescent material, and extends substantially beyond the cover component in a direction away from the second surface of the cover component; and
a housing attached to the cover component, wherein the housing allows at least some light to pass through it; and
an attachment device attached to the housing;
wherein the plurality of LEDs comprises a plurality of low-voltage LEDs arranged in a linear pattern to emulate a filament;
wherein the control circuitry routes electricity generated by the solar panel to the battery when the solar panel is generating electricity; and
wherein the control circuitry routes electricity from the battery to LED filament light bulb when the solar panel is not generating electricity.

20. The LED array light of claim 19, wherein the plurality of LEDs are wired in parallel such that the voltage across the circuit is between 1.4V and 3.2V.

* * * * *